Patented Sept. 21, 1943

2,329,983

UNITED STATES PATENT OFFICE 2,329,983

SHEET MATERIAL AND THE PROCESS FOR MAKING THE SAME

Emil Czapek, New York, N. Y.

No Drawing. Application May 13, 1938, Serial No. 207,810. In Germany January 11, 1937

9 Claims. (Cl. 18—57)

This invention relates to the production of regenerated cellulose structures which may with facility be impregnated with foreign substances. Cellulose, which is coagulated and regenerated from its solutions, as, for instance, viscose or cuprammonium cellulose, constitutes from a colloidal standpoint, a gel-like material which acts as a semi-permeable membrane for colloidal liquids and solutions. Such material whether foils, films, small membranes, caps or the like differ fundamentally from those made of paper on account of the fact that they do not possess any capillaries and therefore do not possess the power of capillary absorption.

As an instance, it is impossible to impregnate these materials as ordinarily constructed with varnish-like substances since these viscous solutions can be coated only on the surface, and cannot be made to penetrate the cellulose structure. It is, however, obvious that substances which have penetrated the cellulose structure are much more firmly combined with the same than coatings applied to the surface, which latter always tend more or less to peel off.

Structures, which have a fine porous structure and possess capillary characteristics or properties, can be produced from regenerated cellulose if insoluble substances are added to the cellulose solution and distributed in the solution in as fine a state as is necessary to satisfy the degree of porosity desired, whereupon the solution is coagulated and regenerated in the well known manner and the insoluble substances separated. The latter separation can if it is desired be effected by the regeneration bath.

Articles made according to the present invention can be carried out in a number of ways. As an instance, in a viscose solution containing seven per cent cellulose, there may be mixed one per cent suspended and finely distributed barium hydroxid at ambient temperature. Coagulate the viscose by means of a salt solution, for instance, sodium bisulfate, and regenerate with a sulfuric acid solution containing sodium bisulfate, which may be heated, in view of the ready solubility of the barium hydroxid, to about fifty degrees centigrade.

Satisfactory results have also been obtained when in a viscose solution of six per cent cellulose content, there is mixed a suspension of sulfur so that the sulfur content will be about one-half per cent. After the sulfur has been uniformly distributed in the viscose, coagulation is effected with an aqueous acid sodium salt solution, regeneration is then effected with a like solution or with dilute sulfuric acid; washing then effected in the usual way; and thereupon the regenerated cellulose treated with an aqueous solution of sodium sulfide $Na_2S$ in order to separate the sulfur. Thereupon, the alkaline sodium sulfide is neutralized by means of a dilute acid and washed in the well known manner with water.

Good results have also been obtained when in a cellulose solution in ammonia copper oxid which contains about five to eight per cent cellulose, a small part of the copper is caused to separate as copper oxid, $CuO$, by careful heating of the solution, whereupon the cellulose is coagulated and regenerated in the well known manner and the $CuO$ dissolved out by means of warm sulfuric acid. It is obvious that the dispersion of the insoluble substance and its concentration will be determined and correspond to the porosity produced.

The materials thus treated are washed, further treated and finally dried in the well known manner. If they are now to be coated or impregnated with a waterproof material, they are covered with a suitable varnish (lacquer) layer which now, as distinguished from the case with non-porous materials, can penetrate into the cellulose through the artificially produced pores. Furthermore, it is of course obvious that before the cellulose solution is finally dried and while it is still in the wet state, the coating in some instances may be applied according to the solution selected.

In this way, the water-proof material will be anchored at many places to the inside of the foil, film, membrane and the like, with the result that it cannot flake or peel off subsequently.

As such protective coating, resin solutions or solutions, for instance, of nitro-cellulose to which softeners are usually added or solutions of rubber and also waxes and the like can be used.

Structures made according to the present invention, may to advantage be used as films, wrappers and the like.

I claim:

1. The process of manufacturing a porous regenerated cellulose structure having fixed accessible pores consisting in treating a cuprammonium cellulose solution to form a uniformly distributed suspension of copper oxide in said cellulose solution, thereupon passing the resulting solution as a layer through a coagulating bath, and thereupon passing said layer through a regenerating bath and dissolving the copper oxide from the layer, the copper oxide being insoluble in the cellulose solution but soluble in the regenerating bath.

2. The process of manufacturing a porous regenerated cellulose structure consisting in spreading out a cellulose solution of copper ammonia, which contains a uniformly distributed suspension of copper oxide, to form a layer, thereupon passing said layer through coagulating baths, and thereupon passing said layer through a regenerating bath of warm sulphuric acid to regenerate said layer and dissolve out the copper oxide.

3. The process of manufacturing a porous regenerated cellulose structure consisting in spreading out a cellulose solution of copper ammonia containing about seven per cent cellulose, which contains a uniformly distributed suspension of copper oxide, to form a layer, thereupon passing said layer through coagulating baths, and thereupon passing said layer through a regenerating bath of warm sulphuric acid to regenerate said layer and dissolve out the copper oxide.

4. The process of manufacturing a porous regenerated cellulose structure consisting in spreading out a cellulose solution of copper ammonia, which contains a uniformly distributed suspension of copper oxide, to form a layer, thereupon passing said layer through coagulating baths, and thereupon passing said layer through a regenerating bath of warm sulphuric acid to regenerate said layer and dissolve out the copper oxide, washing, treating and drying and thereupon coating the porous regenerated cellulose structure with a protecting coating which penetrates into and fills up the pores of the cellulose structure and is anchored thereby against peeling or flaking after being dried.

5. The process for manufacturing a porous regenerated cellulose structure having fixed accessible pores consisting in treating a cellulose solution selected from the group consisting of viscose and cuprammonium to precipitate inorganic particles therein, shaping the resulting solution with the particles suspended therein, passing said shaped solution and the particles through a coagulating bath for the solution and thereafter passing said shaped and coagulated solution with the particles suspended therein through a bath capable of regenerating said cellulose and of dissolving said particles.

6. A transparent, regenerated cellulose sheet having fixed accessible pores constructed throughout the same, said pores being formed by uniformly precipitating solid inorganic particles in a cellulose solution selected from the group consisting of viscose and cuprammonium, shaping said solution in the form of a sheet and coagulating the shaped cellulose solution with the particles therein and thereafter regenerating the cellulose sheet and removing the particles distributed therein by dissolving out the same during the regeneration of the sheet.

7. A transparent, moistureproof regenerated cellulose sheet produced by uniformly precipitating solid inorganic particles in a cellulose solution selected from the group consisting of viscose and cuprammonium, shaping said solution in the form of a sheet and coagulating the shaped cellulose solution with the particles therein, regenerating the cellulose sheet and removing the inorganic particles by dissolving out the same during the regeneration of the sheet and thereafter coating said sheet with a moistureproof composition whereby the coating in anchored to the cellulose sheet against peeling or flaking.

8. A transparent, moistureproof regenerated cellulose sheet produced by uniformly prepicitating solid particles of copper oxide in a cuprammonium cellulose solution, shaping said solution in the form of a sheet and coagulating the shaped cellulose solution with the particles therein, regenerating the cellulose sheet and removing the inorganic particles by dissolving out the same during the regeneration of the sheet and thereafter coating said sheet with a moistureproof composition whereby the coating is anchored to the celulose sheet against peeling or flaking.

9. A transparent, moistureproof regenerated cellulose sheet produced by uniformly precipitating solid particles of sulphur in a viscose solution, shaping said solution in the form of a sheet and coagulating the shaped solution with the particles therein, regenerating the cellulose sheet and removing the inorganic particles by dissolving out the same during the regeneration of the sheet and thereafter coating said sheet with a moistureproof composition whereby the coating is anchored to the cellulose sheet against peeling or flaking.

EMIL CZAPEK.